(12) United States Patent
Li et al.

(10) Patent No.: US 12,242,326 B2
(45) Date of Patent: Mar. 4, 2025

(54) RACK LEVEL POWER THROTTLING

(71) Applicant: Google LLC, Mountain View, CA (US)

(72) Inventors: Xiong Li, Santa Clara, CA (US); Xin Li, Cupertino, CA (US); Qiong Wang, Palo Alto, CA (US); Kaushik Vaidyanathan, Santa Clara, CA (US); Chenhao Nan, Santa Clara, CA (US); Robert Ashby Armistead, III, Los Altos, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 17/894,600

(22) Filed: Aug. 24, 2022

(65) Prior Publication Data

US 2024/0094799 A1   Mar. 21, 2024

(51) Int. Cl.
*G06F 1/32*     (2019.01)
*G06F 1/3296*   (2019.01)

(52) U.S. Cl.
CPC ................ *G06F 1/3296* (2013.01)

(58) Field of Classification Search
CPC .................................................. G06F 1/3296
See application file for complete search history.

(56) References Cited

U.S. PATENT DOCUMENTS

| | | | |
|---|---|---|---|
| 7,062,933 B2 | 6/2006 | Burns et al. | |
| 7,707,443 B2 | 4/2010 | Chheda et al. | |
| 10,146,295 B2 | 12/2018 | Palmer et al. | |
| 10,509,456 B2 | 12/2019 | Lin et al. | |
| 11,126,255 B1 | 9/2021 | Sok et al. | |
| 2010/0083007 A1* | 4/2010 | Howard | G06F 1/30 713/300 |
| 2012/0049908 A1* | 3/2012 | Karlsson | H02M 3/157 327/155 |
| 2013/0159744 A1* | 6/2013 | Gooding | G06F 1/3234 713/320 |
| 2014/0321014 A1 | 10/2014 | Chen et al. | |
| 2015/0169026 A1 | 6/2015 | Bodas et al. | |
| 2016/0127262 A1* | 5/2016 | Lawrence, III | G06F 16/951 709/219 |

(Continued)

FOREIGN PATENT DOCUMENTS

| | | |
|---|---|---|
| CN | 116430977 A | 7/2023 |
| EP | 3879383 A1 | 9/2021 |

OTHER PUBLICATIONS

Pelley et al., "Power Routing: Dynamic Power Provisioning in the Data Center", ASPLOS'10, Mar. 13-17, 2010, 12 pages.

(Continued)

*Primary Examiner* — Zahid Choudhury
(74) *Attorney, Agent, or Firm* — Lerner David LLP

(57) ABSTRACT

The technology is generally directed to a coordinated power throttling mechanism for a payload using power provided by a rack such that the rack power does not exceed a threshold amount for greater than a predetermined period of time. The coordinated power throttling mechanism includes the rack providing a power throttling signal to the payload and the payload executing the power throttling upon detection of the throttling signal. The payload may detect the throttling signal and, after a delay, execute the power throttling. The delay may ensure that all payloads within the rack have detected the power throttling signal.

15 Claims, 7 Drawing Sheets

(56) References Cited

U.S. PATENT DOCUMENTS

| | | | |
|---|---|---|---|
| 2021/0302039 A1* | 9/2021 | Atchison | F24F 11/52 |
| 2021/0405729 A1 | 12/2021 | Abou-Alfotouh et al. | |
| 2024/0094799 A1 | 3/2024 | Li et al. | |

OTHER PUBLICATIONS

Extended European Search Report for EP Patent Application No. 23172817.1 dated Jan. 10, 2024. 14 pages.

Extended European Search Report for European Patent Application No. 24189168.8 dated Dec. 23, 2024. 10 pages.

* cited by examiner

RACK LEVEL POWER THROTTLING

BACKGROUND

The power output of a rack in a server system is relatively consistent, typically fluctuating a small amount based on the load of the rack. For instance, at a typical load the power output of a rack may be 10 kW, but may be up to 10 kW as the amount of power drawn by the payloads increases. The amount of power provided by the rack continuously may be limited to 10 kw, but the rack power components and distribution may support higher power for short time periods For instance, the power system of the rack may be capable of providing a limited amount of power, the operating parameters of the fuses within the rack may limit the amount of power provided by the rack, the current or voltage capacities of a bus bar in the rack may limit the amount of power the rack provides to the payloads, and the battery backup within the rack may limit the amount of power the rack can provide during a power event, such as a power outage. When the load on the rack causes the power output to exceed its maximum power output, the rack may become overloaded or short-circuit, which can lead to damaged components, lost data, or fires.

BRIEF SUMMARY

The technology is generally directed to coordinating a power throttling mechanism for a payload based on the power consumption of the payload detected by a rack power monitoring unit such that the power consumption of the payload does not exceed a threshold amount for greater than a predetermined period of time. This may prevent the rack from short-circuiting or becoming overloaded.

One aspect of the technology is directed to a device comprising a first payload in communication with a rack configured to output voltage to the first payload. The first payload may include one or more processors configured to detect a power throttling signal transmitted by the rack and delay, based on the power throttling signal, throttling power consumption by a period of time.

A duration of the delay may correspond to an amount of time for all other payloads in the rack to detect the power throttling signal. The duration of the delay may correspond to an amount of time for all other payloads in the rack to acknowledge receipt of a power throttling signal. The one or more processors may be further configured to throttle the power consumption of the first payload after the period of time.

The device may further comprise a second payload in communication with the rack. The second payload may include one or more processors configured to detect the power throttling signal transmitted by the rack and delay, based on the power throttling signal, throttling power consumption by the period of time. The one or more processors of the first and second payloads may be further configured to throttle the power consumption of the first and second payloads after the period of time.

When detecting the power throttling signal the one or more processors of the first payload may be configured to detect an input voltage, determine, based on the detected input voltage, a reduction in input voltage, and detect, based on the reduction in voltage, the power throttling signal. When determining the reduction in voltage, the one or more processors of the first payload may be further configured to compare the detected input voltage to a previously detected input voltage.

Another aspect of the technology is directed to a system comprising a rack including a power supply configured to output voltage to at least one payload and one or more rack processors. The one or more rack processors may be configured to detect power consumption by the at least one payload, determine whether the detected power consumption exceeds a threshold amount of power, and when the detected power consumption exceeds the threshold amount of power, transmit a throttling signal to the at least one payload, wherein the throttling signal is a reduction of power output to the at least one payload.

Yet another aspect of the technology is directed to a method comprising receiving, by a first payload in communication with a rack configured to output voltage to the first payload, voltage, detecting, by one or more processors of the first payload, a power throttling signal transmitted by the rack, and delaying, by the one or more processors of the first payload based on the power throttling signal, throttling power consumption of the first payload by a period of time.

DETAILED DESCRIPTION

Figure 1A:
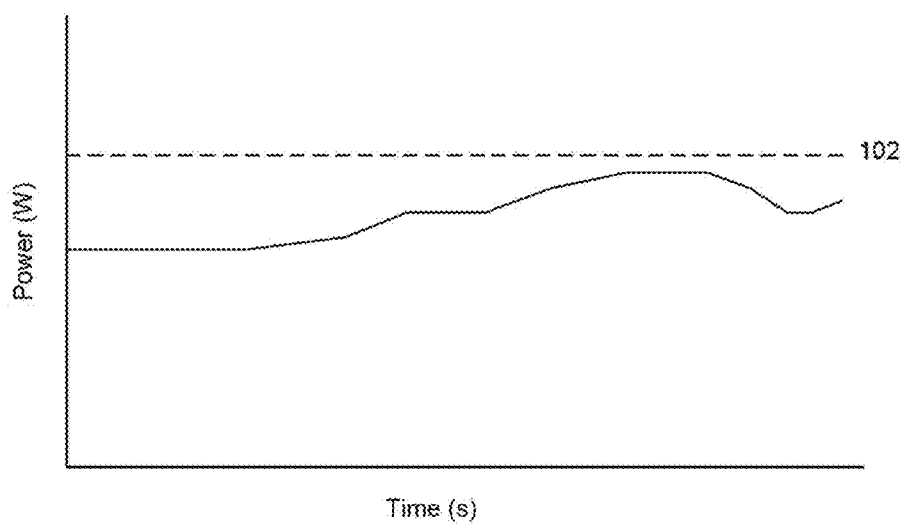
FIG. 1A is a graphical representation of payload power consumption remaining below a threshold in accordance with aspects of the invention.

The technology is generally directed to a coordinated power throttling mechanism for a payload using power provided by a rack. The use of the power throttling mechanism may prevent the rack power from exceeding a threshold amount for greater than a predetermined period of time. The coordinated power throttling mechanism includes the rack providing a power throttling signal, such as a reduction in voltage, to the payloads and the payloads executing the power throttling upon detection of the throttling signal. To make sure all payloads have time to detect the throttling signal communicated by a decreased bus voltage, either the rectifiers can maintain the voltage for a specific amount of time, or payloads can wait before reducing their power consumption. Each payload may detect the throttling signal and, after a delay, execute the power throttling. The delay may ensure that all payloads within the rack have detected the power throttling signal prior to throttling their respective power consumption. The delay in throttling power consumption by a payload may provide other payloads with time to detect the throttling signal. For example, if a payload immediately started to throttle power after detecting the throttling signal, the collective power consumption of the payloads may decrease. As described herein, a decrease in power consumption by a payload may reduce the collective power consumption of the payloads below the threshold amount, resulting in an increase to the output voltage by the power system of the rack, which effectively cancels the throttling signal. Thus, an increase of the output voltage by the power system of the rack may prevent the other payloads from detecting the throttling signal.

The system may include a rack and one or more payloads in communication with the rack. The rack may include a rack monitoring unit configured to detect power consumption from the load and a power system. The power system may include a rectifier configured to output voltage to the payloads and a battery backup. The output voltage of the rectifier may be the input voltage to the payloads. The payloads may be, for example, one or more trays within the rack.

The rack monitoring unit may detect the power consumption from the payloads. When the power consumption of the payloads exceeds a threshold amount of power for a predetermined period of time, the processors may generate a throttling signal. The predetermined period of time may be, for example, an amount of time for continuous power consumption by the payloads. The threshold amount of power may be a percentage of the total available power or a predetermined value. The throttling signal may be a reduction in output voltage from the rectifier.

The payloads may detect a reduction in input voltage. The payloads may determine that the reduction in input voltage is the throttling signal. After detecting the throttling signal, the payloads may throttle power after a predetermined delay. The delay may allow all payloads to detect the reduction in input voltage and, therefore, the throttling signal. For example, the delay prevents the power consumption of the payloads from decreasing before all payloads detect the throttling signal. If the power consumption of the payloads decreases due to the throttling of power consumption from a subset of the payloads, the output voltage of the power system of the rack may increase. An increase in the output voltage of the power system of the rack may correspond to an increase in input voltage to the payloads. An increase to the input voltage to the payloads may cause the remaining payloads to miss the throttling signal as the input voltage may no longer be reduced.

The rack rectifiers may handle a surge load up to a maximum load generated by the payloads for a threshold period of time. In some examples, if the surge load of the payloads is for a period of time greater than the threshold period of time, the rectifiers may become overloaded and/or short-circuit. The threshold period of time may, in some examples, substantially correspond to the delay period.

The maximum load generated by the payload may be a predetermined amount. The predetermined amount may be based on the chip design of the payload. In some examples, the maximum load of the payloads may correspond to the maximum power output of the rack. For example, if the maximum power output of the rack is 120-kW, the maximum combined loads of the payloads may be 120-kW. The 120-kW power is merely provided as an example and should not be considered limiting to the technology described herein. In this regard, the maximum power output of the rack can be any voltage. Likewise, the maximum power draw of the payloads may be greater than 120-kW.

After the delay, the payloads may throttle power. Throttling power may include a reduction in workload, a reduction of an operating frequency, or other such changes in processing by the payloads that reduce the amount of power drawn by the payloads.

By coordinating the throttling mechanism between the rack power and the payloads, the rack power may not exceed a threshold amount for an extended period of time. This may prevent the rack power systems from being overloaded or short-circuiting. The rack power systems may include, for example, one or more rectifiers and battery backups. Moreover, by coordinating the throttling mechanism between the rack and the payloads by including a delay, the delay may ensure that all payloads within the rack have received the throttling signal.

FIG. 1A graphically illustrates an example of the typical power consumption of payloads within a rack. The power to the payloads may be provided by a power system of the rack. The power consumption of the payloads is typically less than a threshold amount 102. The threshold amount 102 may correspond to a percentage of the maximum amount of power the rack power system can produce. For example, the threshold 102 may be ninety-five percent (95%), ninety percent (90%), etc. of the maximum amount of power the rack power system can produce. According to some examples, the threshold amount may correspond to a continuous power consumption limit.

Figure 1B:
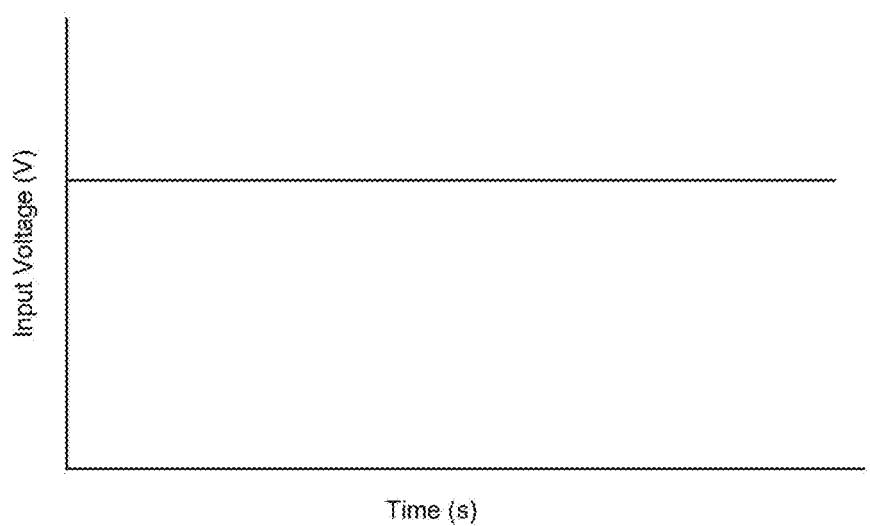
FIG. 1B is a graphical representation of input voltage received by the payloads in accordance with aspects of the invention.
Figure 1C:
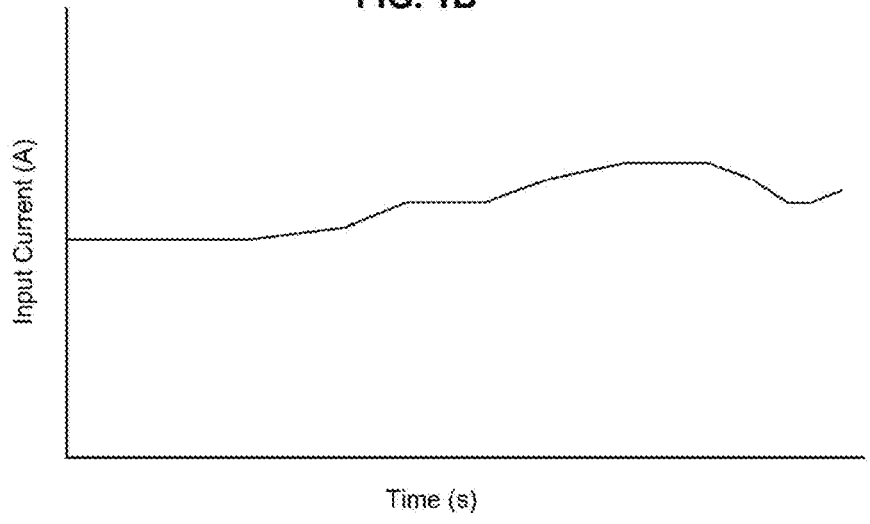
FIG. 1C is a graphical representation of input current received by the payloads in accordance with aspects of the invention.
Figure 2A:
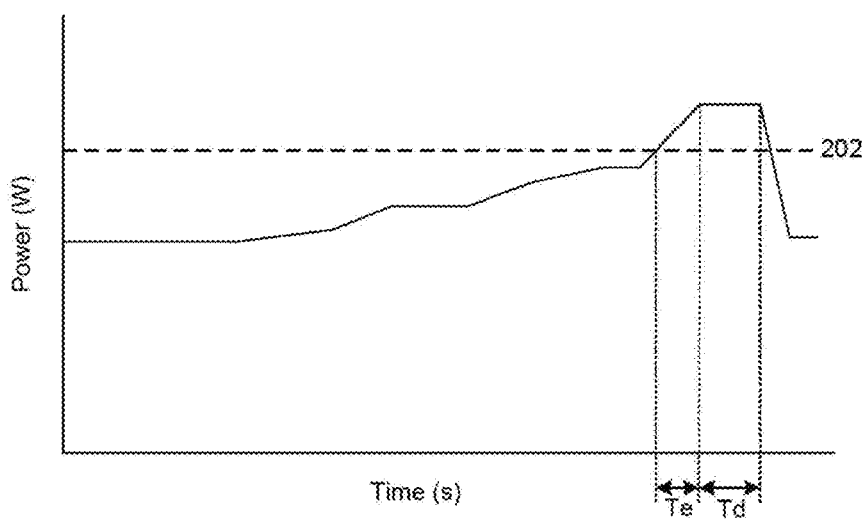
FIG. 2A is a graphical representation of payload power consumption exceeding a threshold in accordance with aspects of the invention.

FIG. 1B graphically illustrates an example of typical input voltage received by the payloads within the rack and FIG. 1C illustrates an example of typical input current received by the payloads within the rack. The input voltage received by the payloads may be provided by the rack power system. The input voltage provided by the rack power system may be adjusted according to the power requirements of the payloads. The input current received by the payloads may be determined based on the power consumption of the payloads and the input voltage received by the payloads. According to some examples, the input voltage received by the payloads may be substantially constant, as shown in FIG. 1B. In such an example, as the power consumption of the payloads increases the input current received by the payloads may also increase, as shown in FIG. 1C. In some examples where the input voltage remains constant, as the power consumption of the payloads increases, the input current received by the payloads may increase proportionally to the increase in power consumption of the payloads. FIG. 2A graphically illustrates an example where the power consumption of the payloads within the rack exceeds a threshold. For example, the power consumption of the payloads may be monitored by the rack monitoring unit. The power consumption of the payloads may be monitored to detect whether the power consumption of the payloads exceeds a threshold 202 for greater than a predetermined period of time Te. The threshold 202 may be, for example, a percentage of the maximum amount of power the rack power system can produce. According to some examples, the threshold 202 power consumption may be ninety-three percent (93%) of the maximum power the rack power system can produce and the predetermined period of time Te may be 42 ms. The threshold 202 may, however, any amount of power or percentage of power the rack power system can produce and the predetermined period of time Te may be greater or less than 42 ms. Therefore, the threshold 202 being 93% of the maximum power the rack system can produce and the predetermined period of time Te being 42 ms is exemplary and is not intended to be limiting.

According to some examples, when the power consumption of the payloads exceeds the threshold 202 for the predetermined period of time Te, the payloads may receive a throttling signal from the rack monitoring unit.

Figure 2B:
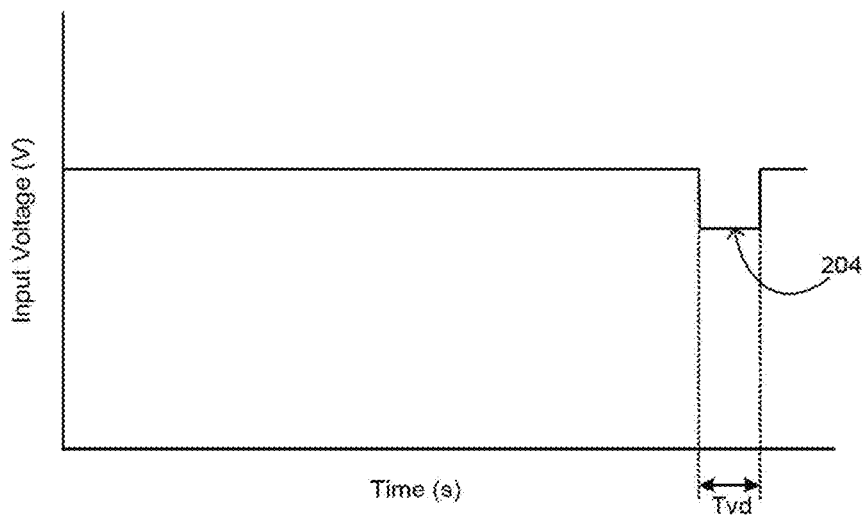
FIG. 2B is a graphical representation of a throttling signal communicated via the voltage level in accordance with aspects of the invention.

FIG. 2B graphically illustrates an example throttling signal received by the payloads. As shown, each payload may receive an input voltage, corresponding to the output voltage of the rack power system. The input voltage received by the payloads may be substantially constant but for the throttling signal.

Figure 2C:
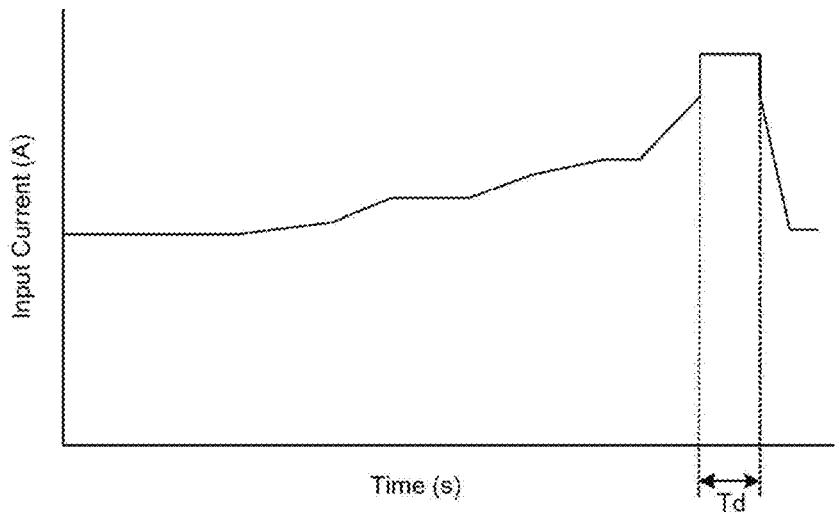
FIG. 2C is a graphical representation of input current received by the payloads in accordance with aspects of the invention.

FIG. 2C graphically illustrates an example of the input current received by the payloads within the rack. The input current received by the payloads may be determined based on the power consumption of the payloads and the input voltage received by the payloads. For example, if the input voltage remains substantially constant, the input current may fluctuate proportional to the changes in power consumption of the payloads. In examples where the input voltage changes, such as when the payloads receive throttling signal 204, the input current may increase. In such an example, as the power consumption of the payloads increases and the input voltage decreases due to the throttling signal 204, the input current may increase as the input voltage and input current are inversely proportional. The throttling signal 204 may be a drop in input voltage. For example, if the rack monitoring unit detects the power consumption of the payloads to be greater than the threshold 202 for at least the predetermined period of time Te, the rack power system may decrease the output voltage to the payloads. The payloads may detect the decrease in input voltage and determine that decrease to be the throttling signal. According to some examples, the decrease in input voltage may occur for a period of time Tvd. After the period of time Tvd, the input voltage may return to substantially the same value prior to the period of time Tvd.

The delay period Td may be the time between receiving the throttling signal and when the payloads throttle their respective power consumption. According to some examples, the payloads, after detecting the throttling signal 204, may wait a delay period Td before throttling their respective power consumption. In another example, the rack power system may maintain the decrease in voltage for the period of time Tvd. After the period of time Tvd, the payloads may throttle their respective power consumption. According to some examples, the period of time Tvd may correspond to the delay period Td.

According to some examples, each payload may begin throttling their respective power consumption at a different time. For example, each payload may wait a respective period of time Tvd after detecting the throttling signal before throttling their respective power consumption. In such an example, each payload may detect the throttling signal at a different time thereby causing the payloads to throttle their respective power consumption at different times. The delay period Td may, therefore, allow all the payloads to detect the throttling signal before one of the payloads begins throttling their respective power consumption. This may prevent one or more payloads from having an increased period of throttling as compared to the remainder of the payloads. Additionally or alternatively, this may prevent one or more payloads from having an increased amount of throttling as compared to the remainder of the payloads.

The delay period Td may allow for each payload within the rack to detect the throttling signal. Detecting the throttling signal 204 may include, for example, determining a reduction in input voltage.

According to some examples, the delay period Td may be a predetermined period of time after the payloads detect the throttling signal until the payloads throttle their respective power consumption. In some examples, the delay period Td may be a period of time in which the input voltage to the payloads is maintained at a predetermined reduced voltage. In another example, the delay period Td may correspond to an amount of time for all payloads within the rack to acknowledge receipt of the throttling signal 204.

According to some examples, the rack monitoring unit may determine that the payloads have received the throttling signal 204 based on a reduction of payload power consumption. For example, the rack monitoring unit may detect that the power consumption of the payloads has decreased below the threshold. The threshold may be, for example, the continuous maximum rating of the rack. For example, the continuous maximum rating of the rack may correspond to a maximum amount of continuous power consumption the rack can output before short-circuiting or becoming overloaded. Upon detection of the power consumption of the payloads decreasing below the threshold, the rack monitoring system may determine that the payloads have received the throttling signal. According to some examples, instead of or in conjunction with, the power rack power system may determine the payloads have received the throttling signal 204.

In some examples, after entering throttling mode, the payloads may exit throttling mode after a predetermined period of time. In examples where the power consumption of the payloads exceeds the threshold after the payloads exit throttling mode, the payloads may receive a subsequent throttling signal. This may be, for example, a cycle by cycle throttling. The payloads may continue to receive throttling signals for any number of cycles until the power consumption of the payloads is below the threshold.

According to some examples, by delaying the time the payloads throttle their respective power consumption, the delay period Td may ensure that a payload does not miss the throttling signal. For example, if a payload immediately throttled its respective power consumption in response to detecting the throttling signal before the other payloads detect the throttling signal, the power consumption of the payloads may decrease. The decrease in power consumption may cause the output voltage of the rack power system to increase. The increase in output voltage may substantially negate the reduction in output voltage corresponding to the throttling signal. The other payloads may, therefore, not detect the throttling signal if a payload were to immediately throttle power. Therefore, delaying the throttling of power after a payload detects the throttling signal may allow for all payloads to detect the throttling signal.

In some examples, by delaying the time the payloads throttle their respective power consumption, the payloads may throttle power consumption equally. According to some examples, in response to the throttle signal, the payloads may lower their respective clock rate or clock work. For example, upon receiving the throttling signal, and after the delay period Td, the payloads may throttle their respective power consumption to a percentage of their maximum power consumption. In some examples, the level of throttling may be predetermined based on the payload design. In one example, the level of throttling may be seventy-five percent (75%) of the maximum power consumption of the payload. However, in other examples, the level of throttling may be eighty percent (80%), seventy-eight percent (78%), ninety-two percent (92%), etc. The seventy-five percent (75%) is, therefore, merely provided as an example and is not intended to be limiting.

In yet another example, delaying the throttling of power of the payload by delay period Td may prevent a payload with a lower threshold from entering and exiting the throttling mode frequently. For example, the output voltage of the rectifier of the rack may be determined based on the load generated by the payloads. If one payload detects the throttling signal and begins throttling its respective power consumption before the other payloads, the power consumption of the totality of the payloads may be reduced. When the power consumption of the totality of the payloads is reduced, the input voltage to the payloads may be increased thereby causing the other payloads to miss the detection of the throttling signal.

According to some examples, instead of the payloads delaying their respective power consumption by delay period Td, the rack power system may maintain the throttle or non-throttle level for greater than the minimum time required for the payloads to detect the throttle. The throttle level may be, for example, a decrease in the output voltage of the rack power system, corresponding to a decrease in input voltage to the payloads.

During the delay, the rack power system may handle a surge load up to a maximum load generated by the payloads. The load generated by the payloads may correspond to the power consumption of the payloads. The maximum power consumption of the payloads may be a predetermined amount based on the design of the payload. According to some examples, the maximum power consumption of the payloads may correspond to the maximum power output of the rack.

According to some examples, the payloads may consume more power for short time periods than the rack power system can provide continuously. For example, the payloads may be able to consume more power than the rack can provide continuously for a threshold period of time. In such an example, the rack power system may handle the increased power consumption for the threshold period of time by having a control loop which will limit average power over a longer time period. The control loop may ensure the power consumption of the payloads remains under the threshold 202 for greater than Te and Td combined. After the delay period Td, the payloads may throttle their respective power consumption such that the power consumption of the payloads is less than the threshold 202. The payloads may throttle their respective power consumption by reducing their respective workload or operating frequency.

Figure 3A:
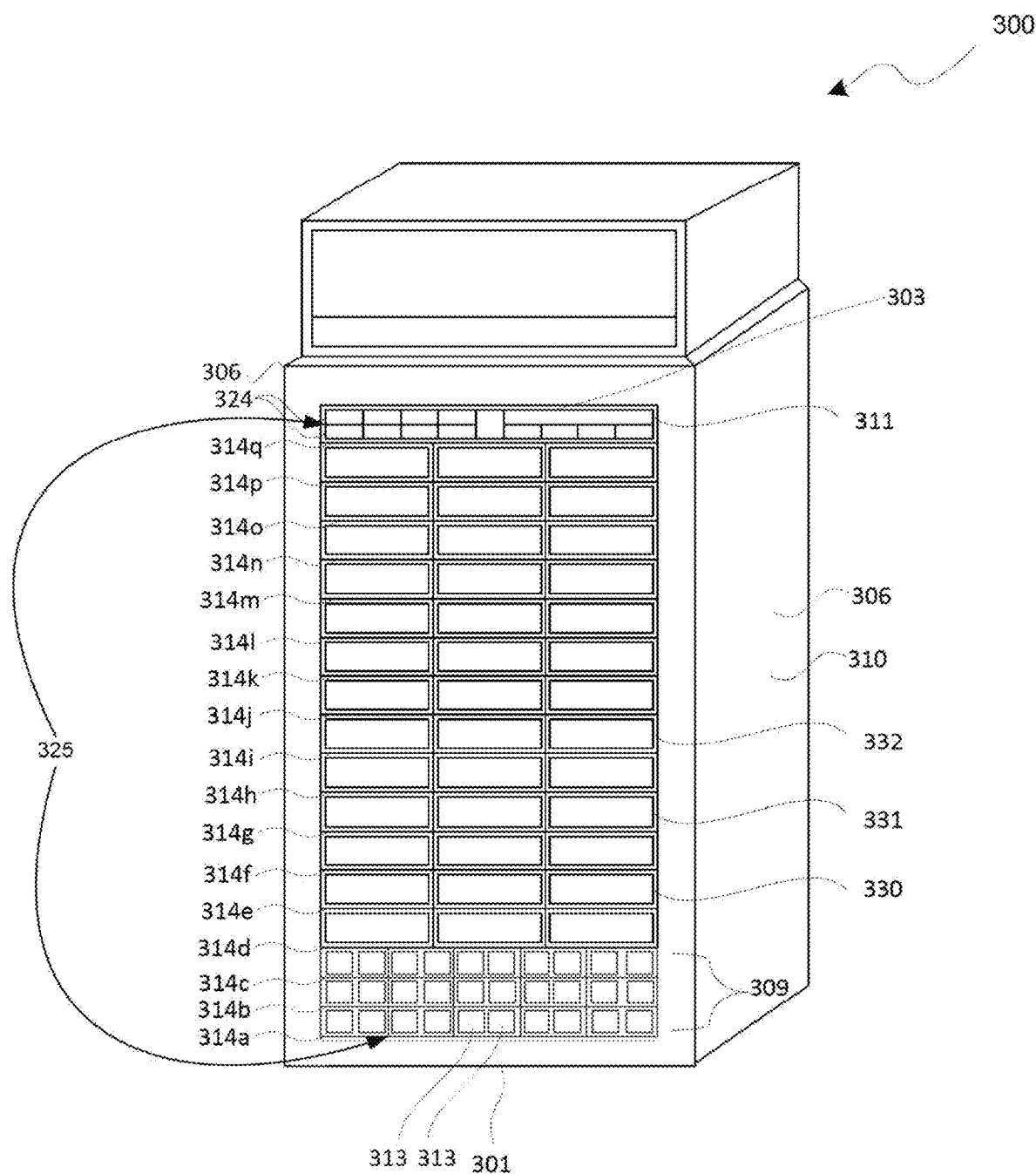
FIG. 3A is a perspective view of a rack in accordance with aspects of the disclosure.
Figure 3B:
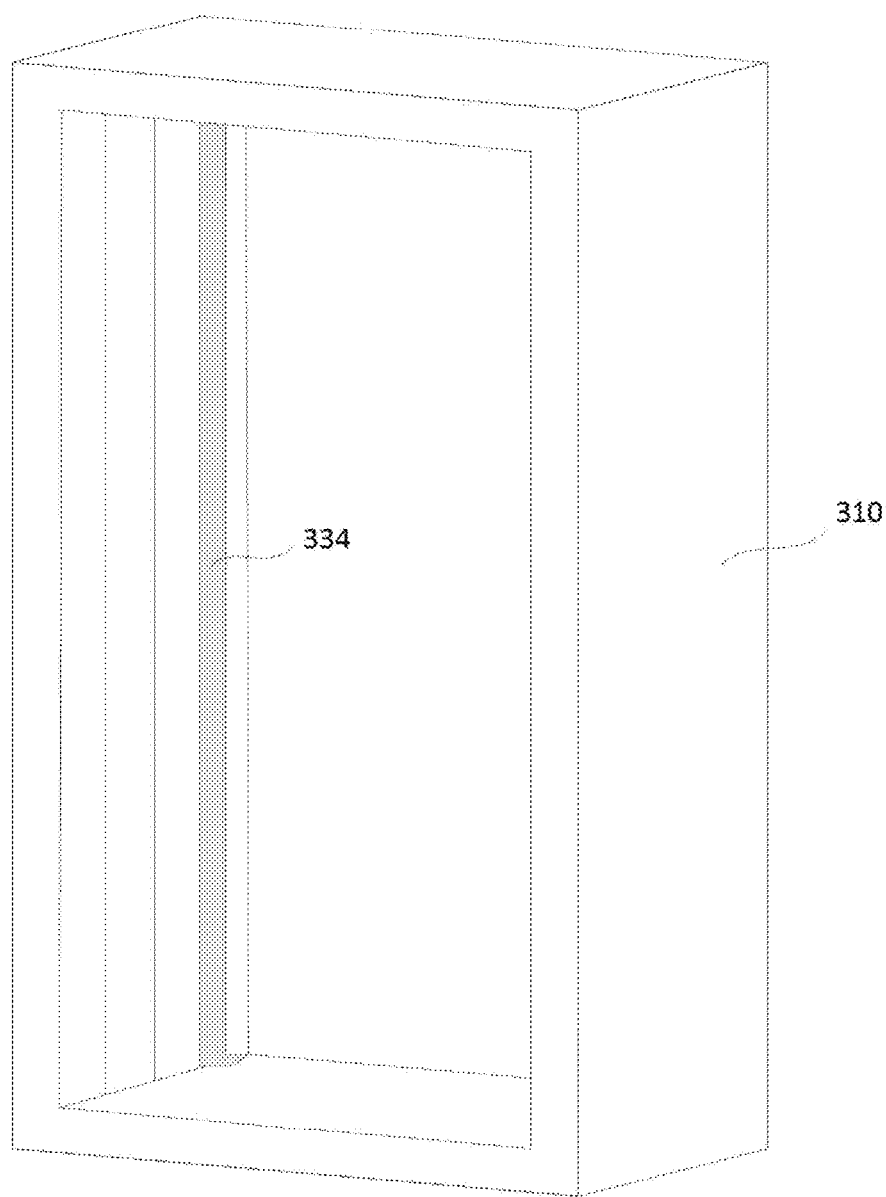
FIG. 3B is another perspective view of the rack of FIG. 3A in accordance with aspects of the disclosure.

FIGS. 3A and 3B are examples of a server system. FIG. 3A depicts a server system 300 that may include a data center rack 310 having a floor 301, a ceiling 303, sidewalls 306, a plurality of shelves 314a-314q for holding payloads, a rack monitoring unit (RMU) 311 for monitoring the status of the features to the rack, a plurality of payloads 330-332, and a power system 325 including a plurality of rectifiers 324 and a battery backup 309, including battery units 313.

In one example, payload 330 may be a dedicated storage device, for example, including any type of memory capable of storing information accessible by a processor, such as a hard-drive, memory card, ROM, RAM, DVD, CD-ROM, or solid state memory. In another example, payload 331 may be a preprogrammed load which draws power from the main bus bar in order to test the operation of the system 300. According to some examples, one or more payloads 330-332 may be servers or trays. Additionally or alternatively, payloads 330-332 may be any device that generates a load. In some examples, payloads 330-332 may be any device that consumes power.

FIG. 3B is an example of rack 310 without shelves 314a-314q. In this figure, it can be seen that the rack 310 includes a main bus bar 334. The main bus bar 334 may be connected to each shelf 314a-314q of the rack 310 to provide power and data to the payloads.

Figure 4:
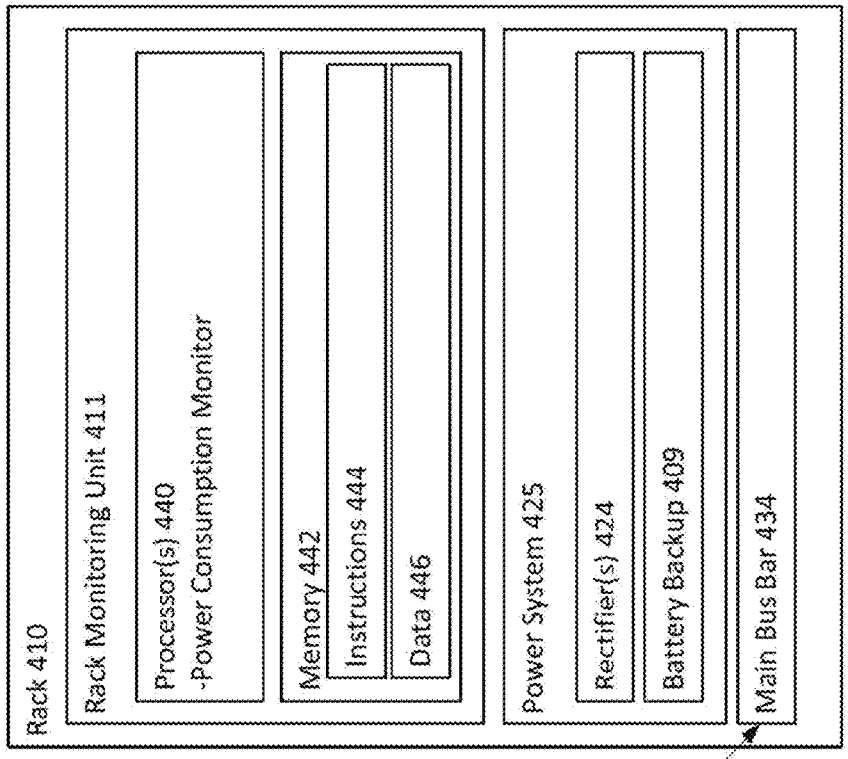
FIG. 4 is a block diagram of an example system in accordance with aspects of the invention.
Figure 4:
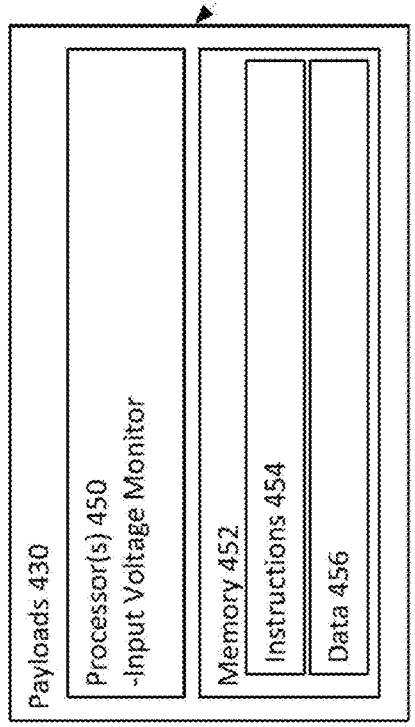

FIG. 4 illustrates an example system 400 in which the features described above and herein may be implemented. While a number of components are shown, such components are merely non-limiting examples and other components may additionally or alternatively be included. The figures should not be considered limiting the scope of the disclosure or usefulness of the features described herein. In this example, system 400 may include a rack 410 and payload(s) 430.

The rack 410 may include a rack monitoring unit 411, power system 425, and main bus bar 434. The rack monitoring unit may include one or more processors 440, memory 442, instructions 44, and data 446.

The processors 440 may be any conventional processors, such as commercially available microprocessors. Alternatively, the one or more processors may be an application specific integrated circuit (ASIC) or other hardware-based processor. Although FIG. 4 functionally illustrates the processor, memory, and other elements of rack 410 as being within the same block, it will be understood by those of ordinary skill in the art that the processor, computing device, or memory may actually include multiple processors, computing devices, or memories that may or may not be stored within the same physical housing. Similarly, the memory may be a hard drive or other storage media located in a housing different from that of rack 410. Accordingly, references to a processor or computing device will be understood to include references to a collection of processors or computing devices or memories that may or may not operate in parallel.

Memory 442 may store information that is accessible by the processors, including instructions 444 that may be executed by the processors 440. The memory 442 may be a type of memory operative to store information accessible by the processors 440, including a non-transitory computer-readable medium, or other medium that stores data that may be read with the aid of an electronic device, such as a hard-drive, memory card, read-only memory ("“ROM”"), random access memory ("RAM"), optical disks, as well as other write-capable and read-only memories. The subject matter disclosed herein may include different combinations of the foregoing, whereby different portions of the instructions 444 and data 446 are stored on different types of media.

Memory 442 may be retrieved, stored or modified by processors 440 in accordance with the instructions 444. For instance, although the present disclosure is not limited by a particular data structure, the data 446 may be stored in computer registers, in a relational database as a table having a plurality of different fields and records, XML documents, or flat files. The data 446 may also be formatted in a computer-readable format such as, but not limited to, binary values, ASCII or Unicode. By further way of example only, the data 446 may be stored as bitmaps comprised of pixels that are stored in compressed or uncompressed, or various image formats (e.g., JPEG), vector-based formats (e.g., SVG) or computer instructions for drawing graphics. Moreover, the data 446 may comprise information sufficient to identify the relevant information, such as numbers, descriptive text, proprietary codes, pointers, references to data stored in other memories (including other network locations) or information that is used by a function to calculate the relevant data.

The instructions 444 can be any set of instructions to be executed directly, such as machine code, or indirectly, such as scripts, by the processor 440. In that regard, the terms "instructions," "application," "steps," and "programs" can be used interchangeably herein. The instructions can be stored in object code format for direct processing by the processor, or in any other computing device language including scripts or collections of independent source code modules that are interpreted on demand or compiled in advance. Functions, methods and routines of the instructions are explained in more detail below.

The processors 440 may include a power consumption monitor that monitors the power consumption of the one or more payloads 430. The power consumption monitor may detect whether the power consumption of the payloads 430 exceeds a threshold power consumption, as shown in FIG. 2A. When the power consumption monitor detects that the power consumption of the payloads exceeds the threshold for a predetermined period of time, the processors 440 in conjunction with power system 425 may send a throttling signal to the payloads 430 via main bus bar 434. The throttling signal may be, for example, a decrease in voltage. For example, processor 440 may execute instructions 444 to decrease the output voltage of power system 425. The decreased output voltage may be transmitted to payloads 430 via main bus bar 434. According to some examples, a decreased output voltage for a predetermined period of time may be a throttling signal to the payloads.

Power system 425 may include one or more rectifiers 424 and battery backup 409. The rectifiers 424 may be connected to the main bus bar 434 and supply voltage and, therefore, power to the payloads 430. The battery backup 409 may include on or more battery units, such as battery units 313. The battery backup 409 may provide power in the case of a power event, such as a power outage.

Figure 5:
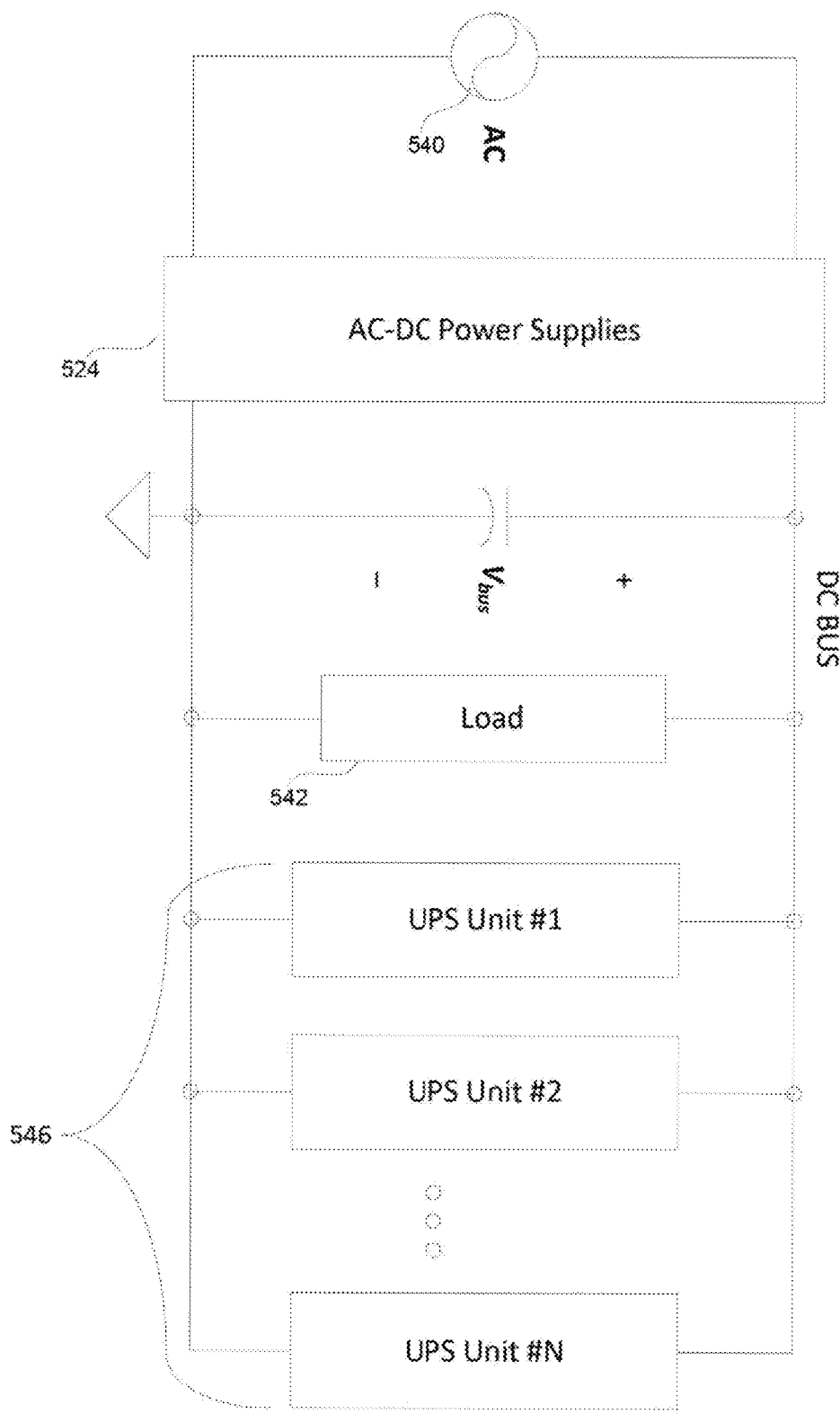
FIG. 5 is a schematic diagram of an example power architecture in accordance with aspects of the disclosure.

FIG. 5 is an example of a power architecture for power system 425. An AC power source 540 may be connected to the rectifiers 424. In this example, the rectifiers 424 may be AC to DC rectifiers 524, as shown in FIG. 5. The rectifiers 524 may be connected to the main bus bar 334 and supply power to a payload, such as payloads 330-332 shown in FIG. 3A. The load 542 may be connected in parallel to a plurality of uninterruptible power supply units (UPS) 546. The UPSs 546 may correspond to the battery units 313 disposed on shelves 314a-314c, shown in FIG. 3A. According to some examples, UPSs 546 may make up the battery backup supply 309, 409.

Returning to FIG. 4, the main bus bar 434 may provide power and data from the rack 410 to the payloads 430. Additionally or alternatively, the main bus bar 434 may provide data from the payloads 430 to the rack 410.

Payloads 430 may include one or more processors 450, memory 452, instructions 454, and data 456 that are substantially similar to those described herein with respect to rack 410.

The processors 450 may include an input voltage monitor that monitors the input voltage from the power system 425 of rack 410. The input voltage monitor may monitor the input voltage to detect a reduction in voltage. A reduction in voltage to a predetermined period of time may be a throttling signal.

Referring back to FIGS. 2A-2C, if the rack monitoring unit 411 detects the power consumption of the payloads 430 has exceeded threshold 202 for the predetermined period of time Te, the output voltage of the power system 425 may be reduced. In an example where the default output voltage of the power system 425 is 54.5V when there is no load from the payloads 430 and 53.5V when there is a full load from the payloads 430, the output voltage of the power system 425 may be reduced to 52 volts. The processors 450 of payload 430 may detect the input voltage has dropped to 52V, within a tolerance. The processors 450 of the payload may determine that the drop in input voltage is a throttling signal 204.

After detecting the throttling signal 204, the payloads 430 may delay executing power throttling. The delay period Td may be between 10 ms and 50 ms. The delay period Td may allow time for all the payloads 430 in rack 410 to detect the voltage drop and, therefore, the throttling signal 204. After the delay period Td, the payloads 430 may execute the power throttling.

According to some examples, the period of time Tvd for the voltage drop may be the delay period. For example, the power system 425 may maintain the decreased output voltage for the period of time Tvd. The payloads 430 may detect the decreased input voltage for the period of time Tvd and may begin to throttle power after once the input voltage increases.

In another example, the rack 410 may implement a dynamic droop. The droop may be 10 mV/A when the load from the payloads 430 is less than 90%. The droop may change to 500 mV/A when the load is between 90-95%. The droop may dynamically change back to 10 mV/A when the load exceeds 95%. The dynamic droop may allow for more effective current sharing while maintaining an output voltage less than a predetermined value when the load from the payloads 430 exceeds the threshold 202. For example, the dynamic droop may allow for the output voltage of the power system 425 to be less than 52V when the load exceeds 95%.

In examples where there is a power event, such as a power outage, the power supplied by the rack 410 may be transferred from rectifiers 424 to battery backup 409. The output voltage of the battery backup 409 may drop below a threshold, such as below 52V, when there is a large load from the payloads 430 on the rack 410. In such an example, the payloads 430 may detect a drop in input voltage. The detected input voltage may be a throttle signal 204. After detecting the throttling signal 204, the payloads 430 may delay throttling power by the delay period Td. During the delay period Td, the battery backup 409 may provide a portion of the power to the payloads 430 and the hold-up capacitors of the rectifier 424 may provide any remaining power necessary. For example, if the maximum rack power is 120 kW, the batteries may provide 100 kW of power and the hold-up capacitors may provide the remaining 20 kW of power. The hold-up capacitors may be able to provide power for a predetermined period of time. The predetermined period of time may be greater than the delay period Td.

Figure 6:
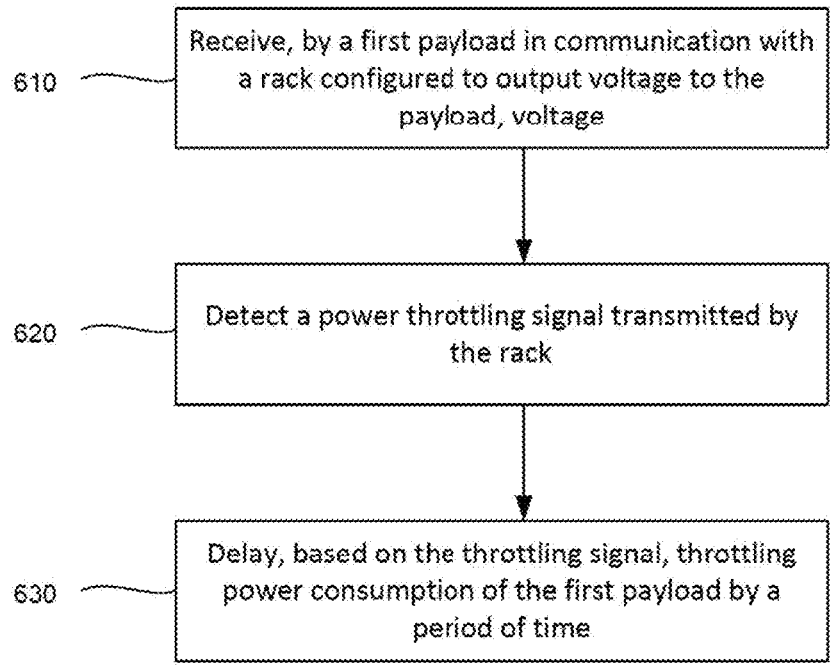
FIG. 6 is a flow diagram for an example method of delaying throttling power consumption in accordance with aspects of the invention.

FIG. 6 illustrates an example method for delaying throttling power consumption. The following operations do not have to be performed in the precise order described below. Rather, various operations can be handled in a different order or simultaneously, and operations may be added or omitted.

In block 610, a first payload may receive voltage. The voltage may be from a rack configured to output voltage to the first payload. For example, the rack may include a power system including a rectifier and battery backup. The power system of the rack may transmit voltage to the first payload via a main bus bar in the rack.

In block 620, the first payload may detect a power throttling signal transmitted by the rack. The throttling signal may be transmitted to the first payload from the rack via the main bus bar. Detecting the power throttling signal may include detecting an input voltage and determining, based on the detected input voltage, a reduction in input voltage. The reduction in input voltage may correspond to a reduction of output voltage from the power system of the rack. In some examples, when determining the reduction in voltage, the first payload may compare the detected input voltage to a previously detected input voltage. If the detected input voltage is less than the previously detected input voltage, the first payload may determine there was a reduction in voltage. The first payload may detect the power throttling signal based on the reduction in voltage. For example, the throttling signal may be a reduction in input voltage.

In block 630, the first payload may delay, based on the throttling signal, throttling power consumption by a period of time. The duration of the delay may correspond to an amount of time for all other payloads in the rack to detect the power throttling signal. In some examples, the duration of the delay may correspond to an amount of time for all other payloads in the rack to acknowledge receipt of the power throttling signal.

The first payload may throttle its power consumption after the period of time.

According to some examples, a second payload in communication with the rack may receive the voltage. The second payload may detect the power throttling signal transmitted by the rack. The second payload may delay, based on the throttling signal, throttling power consumption by the period of time. In such an example, the first and second payloads may throttle their respective power consumption after the period of time.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A device, comprising:
 a first payload in communication with a rack configured to output voltage to the first payload, the first payload including one or more processors configured to:
  detect a power throttling signal transmitted by the rack; and
  delay, based on the power throttling signal, throttling power consumption of the first payload by a period of time, wherein a duration of the delay corresponds to at least one of:
   an amount of time for all other payloads in the rack to detect the power throttling signal, or
   an amount of time for all other payloads in the rack to acknowledge receipt of a power throttling signal.

2. The device of claim 1, wherein the one or more processors are further configured to throttle the power consumption of the first payload after the period of time.

3. The device of claim 1, further comprising a second payload in communication with the rack, the second payload including one or more processors configured to:
 detect the power throttling signal transmitted by the rack; and
 delay, based on the power throttling signal, throttling power consumption by the period of time.

4. The device of claim 3, wherein the one or more processors of the first and second payloads are further configured to throttle the power consumption of the first and second payloads after the period of time.

5. The device of claim 1, wherein when detecting the power throttling signal, one or more processors of the first payload are configured to:
 detect an input voltage;
 determine, based on the detected input voltage, a reduction in input voltage; and
 detect, based on the reduction in voltage, the power throttling signal.

6. The device of claim 5, wherein when determining the reduction in input voltage, the one or more processors of the first payload are further configured to compare the detected input voltage to a previously detected input voltage.

7. A system, comprising:
 a rack including a power supply configured to output voltage to at least one payload and one or more rack processors, the one or more rack processors configured to:
  detect power consumption by the at least one payload;
  determine whether the detected power consumption exceeds a threshold amount of power; and
  when the detected power consumption exceeds the threshold amount of power, transmit a throttling signal to the at least one payload, wherein the throttling signal is a reduction of power output to the at least one payload; and
 the at least one payload comprising one or more payload processors, wherein when receiving the throttling signal, the one or more payload processors are configured to:
  detect an input voltage;
  determine, based on the detected input voltage, a reduction in the input voltage, wherein the reduction in the input voltage for a predetermined period of time is the throttling signal; and
  detect, based on the reduction in the input voltage for at least the predetermined period of time, the throttling signal.

8. The system of claim 7, wherein the one or more payload processors are further configured to:
 delay, based on the throttling signal, throttling power consumption by a period of time.

9. The system of claim 8, wherein the one or more payload processors are further configured to throttle the power consumption of the at least one payload after the period of time.

10. The system of claim 7, wherein when determining the reduction in input voltage, the one or more payload processors are further configured to compare the detected input voltage to a previously detected input voltage.

11. A method, comprising:
 receiving, by a first payload in communication with a rack configured to output voltage to the first payload, voltage;

detecting, by one or more processors of the first payload, a power throttling signal transmitted by the rack; and delaying, by the one or more processors of the first payload based on the power throttling signal, throttling power consumption of the first payload by a period of time, wherein a duration of the delay corresponds to at least one of:

an amount of time for all other payloads in the rack to detect the power throttling signal, or an amount of time for all other payloads in the rack to acknowledge receipt of a power throttling signal.

12. The method of claim 11, further comprising throttling, by the one or more processors of the first payload, the power consumption of the first payload after the period of time.

13. The method of claim 11, further comprising:

receiving, by a second payload in communication with the rack, the voltage;

detecting, by the one or more processors of the second payload, the power throttling signal transmitted by the rack; and delaying, by the one or more processors of the second payload based on the power throttling signal, throttling power consumption of the second payload by the period of time.

14. The method of claim 13, further comprising throttling, by the one or more processors of the first and second payloads, the power consumption of the first and second payloads after the period of time.

15. The method of claim 11, wherein when detecting the power throttling signal the method further comprises:

detecting, by the one or more processors of the first payload, an input voltage;

determining, by the one or more processors of the first payload based on the detected input voltage, a reduction in input voltage; and detecting, by the one or more processors of the first payload based on the reduction in voltage, the power throttling signal.

* * * * *